UNITED STATES PATENT OFFICE.

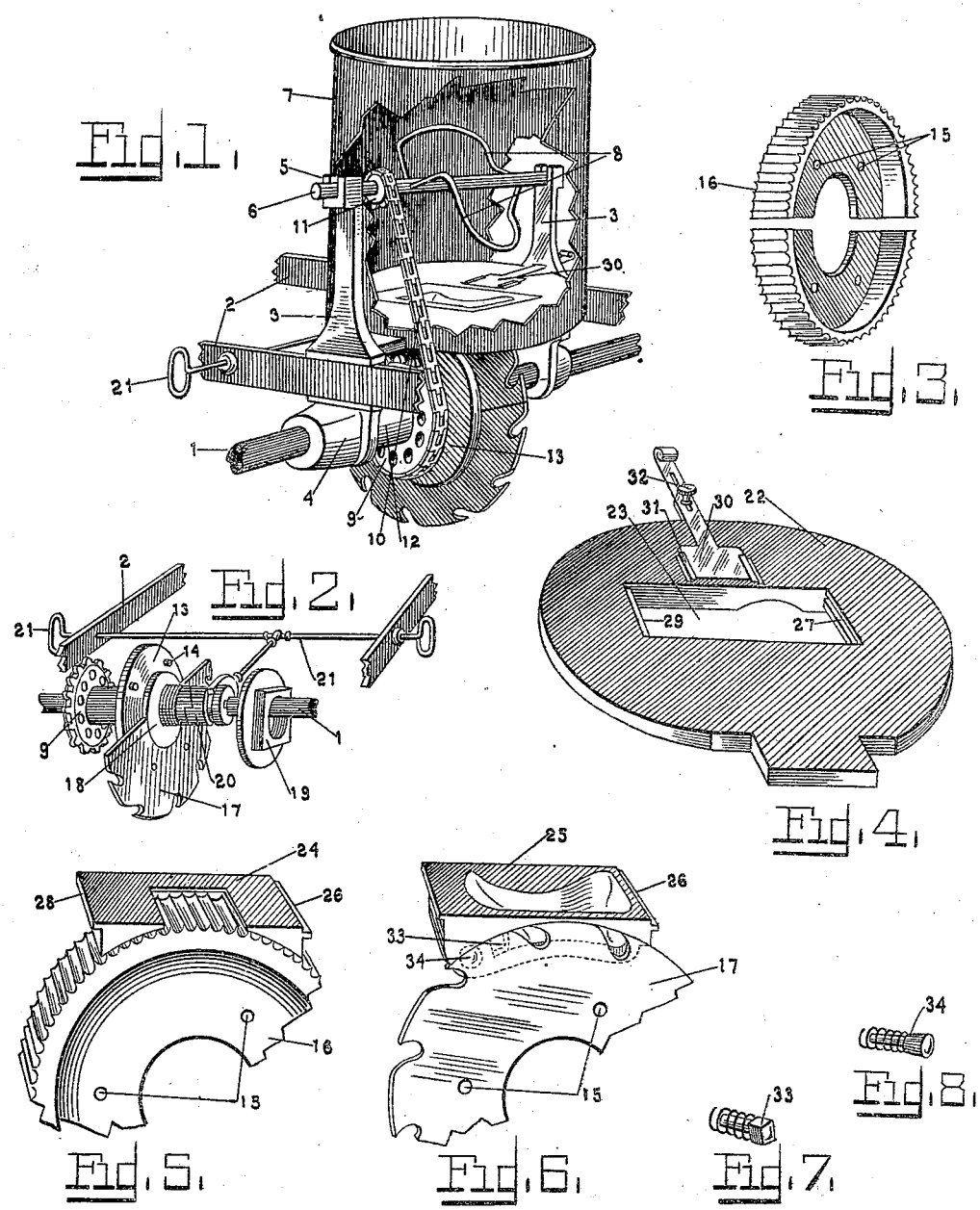

WILLIAM A. WILSON, OF DE LEON, TEXAS, ASSIGNOR OF ONE-HALF TO JAMES M. WHALEY, OF DE LEON, TEXAS.

SEED-PLANTER.

944,396.  Specification of Letters Patent.  Patented Dec. 28, 1909.

Application filed May 18, 1909.  Serial No. 496,687.

*To all whom it may concern:*

Be it known that I, WILLIAM A. WILSON, a citizen of the United States, residing at De Leon, in the county of Comanche and State of Texas, have invented certain new and useful Improvements in Seed-Planters, of which the following is a specification.

My invention relates to new and useful improvements in seed planters and more particularly in corn and cotton planters. Its object is to provide a seed planter, the operating mechanism of which will be mounted directly upon the axle, thus obviating the use of bevel gears, and whose construction will be simpler than the present forms of seed planters.

Another object is to provide a planter adapted to deposit in each hill any desired number of cotton seeds.

Finally, the object of my invention is to provide a device of the character described, which will be strong, simple and durable, efficient, and comparatively easy to construct, also one in which the various parts will not be likely to get out of working order.

With these and various other objects in view, the invention has relation to certain novel features of construction and operation, an example of which is described in the following specification and illustrated in the accompanying drawing, wherein:

Figure 1 is a perspective view of the operating mechanism of the planter, showing a portion of the axle and a portion of the frame mounted thereupon. The seed hopper is in part broken away, revealing the interior construction. Fig. 2 is a perspective view of that portion of the axle, which carries the operating mechanism, showing a clutch whereby said mechanism may be made inoperative. Fig. 3 is a perspective detail of the two halves of a serrated wheel used to discharge cotton seed from the hopper. Fig. 4 is a perspective view of the apertured bottom plate of the seed hopper, showing the device which serves to regulate the number of seed planted in each hill. Fig. 5 is a perspective view showing a portion of the serrated wheel used to discharge cotton seed from the hopper, and shows the operative position of the same relative to the apertured closure which is used in conjunction with said wheel and is adapted to fit into the opening shown in the bottom plate of the hopper. Fig. 6 is a similar view in perspective of a portion of the cellular wheel which discharges seed-corn from the hopper, showing the position of the accompanying closure which fits into the bottom of the hopper. Figs. 7 and 8 are perspective details of small spring-pressed plungers, the use of which will be fully explained hereinafter.

Referring now more particularly to the drawings, wherein like numerals of reference designate similar parts in all the figures, the numeral 1 designates the axle of the seed planter upon which longitudinal beams 2 forming the frame of the planter are mounted. Brackets 3 support said longitudinal beams above the axle, the lower part of said brackets being provided with suitable bearings 4, in which the axle turns, and the upper extremities being extended to form bearings 5 for a spindle 6 passing through the seed can 7 and carrying the two curved wires 8 which agitate the seed and feed it to the discharging mechanism. A sprocket 9 communicates rotation from the axle to a sprocket 11, carried by the spindle 6 by means of a chain 10. The sprocket 9 is rigid upon one extremity of a sleeve 12, which sleeve also carries the disk 13. Upon the side of this disk away from the gear are a plurality of small pegs 14, designed to be introduced into suitable apertures 15 in the seed plates or disks 16 or 17. A hub or boss 18, upon the disk 13, fits into the central aperture in the seed plates. An exteriorly threaded portion of the sleeve 12 adjacent to said boss is adapted to receive the nut 19, which is made tight against the seed plates when they are in place, preventing displacement of the same. A clutch 20 operated by a lever 21 permits the feeding mechanism to be made inoperative when desired. The seed plates are made in two halves to permit of their being placed upon the sleeve 12. The base plate 22 of the seed hopper is provided with an aperture 23, adapted to receive either of the closures 24 and 25, the former being used in conjunction with the cotton-seed wheel 16, and the latter with the corn disk 17. A tongue 26 upon one end of each closure enters a groove 27 in the base plate and the projection 28 at the other end of each closure is seated upon the shoulder 29 of the base plate.

In conjunction with the cotton feeding wheel 16, is used a guard 30, sliding in guides 31, and provided with a shank or handle adapted to be held in adjustment by means of a set screw 32. By sliding this guard forward to cover a portion of the seed delivery aperture in plate 22 which fits into the opening 23 in the bottom of the hopper, the number of seeds entering the grooves of the seed wheel may be regulated as desired. The two plungers shown in Figs. 7 and 8 are provided with suitable sockets in the closure 25. The square headed plunger 33 of Fig. 7 is set into the side of the closure 25 at the point where the seed-corn enters the pockets in the rotating plate, preventing the smaller kernels of corn from being carried between the wheel and the closure. The purpose of the spring is to permit the plunger to give slightly to enable the larger kernels of corn to pass freely in the pockets of the seed wheel. The round headed plunger 34 shown in Fig. 8 is set in the side of the plate 25 at the extreme end thereof in such a manner that the plunger exerts a pressure upon each kernel of corn as it passes and thrusts it from the seed wheel.

The wires 8 of the seed agitator when at the lowest point of their rotation are moving in a direction opposite to that of the upper part of the seed wheel rim; so that the agitator constantly tends to thrust the seed into the cells in the periphery of the wheel and they are carried around by the rotation of the wheel until discharged therefrom by the plunger 33. Any ordinary form of boot will serve to conduct the seed from the wheel to the ground.

It is obvious that the seed may be planted any desired distance apart by the use of the above described mechanism.

The number of seed pockets or grooves in the periphery of the seed wheel determine the number of hills that will be discharged or deposited during one revolution of the planter's transporting wheels.

The absence of valves and beveled gears adds greatly to the simplicity and cheapness of the device. By properly determining the necessary number of grooves in the cotton seed wheel 17 relative to the circumference of the transporting wheels, it will be possible to plant cotton "to a stand" and eliminate the waste of seed and labor, necessary when cotton is not so planted.

Since this device deposits the seed in hills at any desired interval apart, it accomplishes the purpose of a cotton chopper, and makes the use of that mechanism unnecessary.

What I claim, is:

1. In a seed planter the combination with the axle thereof, of a seed hopper mounted above the axle, having an apertured base, a disk adapted to rotate upon the axle, having a grooved rim, a closure adapted to be removably secured in the aperture of the hopper base, and containing an aperture into which the rim of said disk projects, a spring pressed plunger socketed in the aforesaid closure preventing the seed from passing between the disk and closure and a spring pressed plunger discharging the seed from the disk pockets exterior to the hopper.

2. In a seed planter, the combination with the planter axle, of a seed hopper mounted above the axle provided with an apertured base, a disk upon the axle, adapted to turn therewith, the rim of which contains grooves adapted to receive the seed, and forms a closure for the aperture in the hopper bottom, an agitator mounted to revolve within the hopper, means whereby rotation is communicated to the agitator from the vehicle axle, and a clutch whereby said grooved wheel and said agitator may be made inoperative.

3. In a seed planter, the combination with the axle of the vehicle, of a seed hopper mounted above the axle, having an apertured base, a sleeve loose upon the axle, a clutch, making said sleeve normally rotative upon the shaft, and adapted to make it non-rotative, a circular seed plate, adapted to be made fast upon said sleeve, having a grooved rim forming a closure for the aperture of the hopper base, an agitator, rotating within the hopper, and mechanism communicating rotation to said agitator from said sleeve upon the axle.

4. In a seed planter, the combination with the axle of the planter, of a seed hopper mounted above the axle, having an apertured base, a sleeve loose upon the axle, a clutch, normally engaging said sleeve, whereby it may be made inoperative, a circular seed plate provided with a grooved rim adapted to be made fast upon said sleeve, a closure removably secured in the aperture in the hopper base, having an aperture into which the seed plate rim projects and closes the same, an agitator mounted to rotate within the hopper, consisting of a plurality of curved wires whose extremities are attached to a central spindle, and mechanism operating the agitator spindle from said sleeve upon the axle.

5. In a seed planter, the combination with the vehicle axle, of a seed hopper mounted there-above, provided with an apertured base, a sleeve loose upon the axle, a clutch controlling the rotation of said sleeve, means whereby a disk may be made fast upon said sleeve, a disk adapted to be made fast upon said sleeve and having a grooved rim projecting into the aperture of the hopper base, a closure adapted to be secured in said aperture of the hopper base, and containing an orifice permitting the seed to enter the grooves in the rim of seed wheel, the seed disk rim forming a closure for said orifice, an agitator, rotatably mounted within the hopper and means whereby rotation is communicated to said agitator from said sleeve upon the axle.

6. In a seed planter, the combination with the frame thereof, of a seed-hopper carried by the frame having an apertured base, an apertured closure adapted to be removably secured in the aperture of the hopper base, a disk rotatably mounted beneath the hopper having a grooved rim, and projecting into the aperture of said closure, means communicating rotation to said disk from the transporting wheels, and means of interrupting the communication of such rotation.

7. In a seed planter, the combination with the frame thereof, of a seed-hopper carried by the frame, having an apertured base, an apertured closure, adapted to be removably secured in the aperture of the hopper base, a disk provided with a grooved rim, rotatably mounted beneath the hopper, and projecting into the aperture of said closure a spring pressed plunger socketed in the aforesaid closure preventing the passage of seed between disk and closure, a spring pressed plunger socketed in the closure to eject the seed from the disk grooves and means communicating rotation to the disk from the transporting wheels.

8. In a seed planter, the combination with a frame and transporting wheels supporting the same of a seed-hopper carried by the frame having an apertured base, a closure adapted to be removably secured in the aperture of the hopper base, said closure having a seed discharging orifice, a disk rotatably mounted beneath the hopper, having a grooved rim, and projecting into the said discharging orifice of said closure, means whereby rotation is communicated to said disk from the transporting wheels, a clutch whereby the communication of such rotation may be interrupted, an agitator rotatably mounted within the hopper, and means whereby rotation is communicated to the same from the transporting wheels.

In testimony whereof I have signed my name to this specification in the presence of two subscribing witnesses.

WILLIAM A. WILSON.

Witnesses:
JOHN S. MURRAY,
JESSIE KIRK.